United States Patent

Hongo

[11] Patent Number: 5,972,212
[45] Date of Patent: Oct. 26, 1999

[54] APPARATUS FOR TREATING ORGANIC WASTE WATER UTILIZING MICROORGANISMS

[75] Inventor: Kenjiro Hongo, Tokyo, Japan

[73] Assignee: Hongo Company Limited, Tokyo, Japan

[21] Appl. No.: 08/998,853

[22] Filed: Dec. 29, 1997

[30] Foreign Application Priority Data

Dec. 30, 1996 [JP] Japan .................................... 8-359253
Jul. 9, 1997 [JP] Japan .................................... 9-199208

[51] Int. Cl.$^6$ ......................................................... C02F 3/06
[52] U.S. Cl. ......................... 210/150; 210/194; 210/220; 210/615
[58] Field of Search .................................... 210/150, 151, 210/194, 195.1, 197, 220, 615

[56] References Cited

U.S. PATENT DOCUMENTS

| | | | |
|---|---|---|---|
| 3,112,261 | 11/1963 | Porter et al. | 210/150 |
| 3,329,271 | 7/1967 | Ward et a. | 210/150 |
| 3,966,599 | 6/1976 | Burkhead | 210/151 |
| 4,045,344 | 8/1977 | Yokota | 210/194 |
| 4,427,548 | 1/1984 | Quick, Jr. | 210/150 |
| 4,477,394 | 10/1984 | Armstrong et al. | 210/150 |
| 4,954,257 | 9/1990 | Vogelpohl et al. | 210/151 |
| 5,190,646 | 3/1993 | Hattori et al. | 210/151 |
| 5,770,059 | 6/1998 | Rhee | 210/195.1 |

FOREIGN PATENT DOCUMENTS

| | | |
|---|---|---|
| 2841011 | 4/1980 | Germany . |
| 59-19584 | 2/1984 | Japan . |
| 3-127691 | 5/1991 | Japan . |
| 3-207493 | 9/1991 | Japan . |
| 912677 | 5/1982 | U.S.S.R. . |

*Primary Examiner*—Christopher Upton
*Attorney, Agent, or Firm*—Lackenbach Siegel Marzullo Aronson & Greenspan, P.C.

[57] ABSTRACT

A waste water purifying apparatus utilizes microorganisms, which comprises an inner casing (1), an outer casing (2), a waste water supply tank (3) and an air supply pipe (4). The inner casing is a vertical type and its upper and lower end are open. Plural porous discs 7 of polyethylene which have liquid passages (6) are piled in the inner casing with each space between every two carrier discs.

The outer casing is a vertical type whose bottom is closed by a bottom cap (12) and arranged coaxially with the inner casing with a downward circuit (13) for liquid there between. The outer casing has outflow ports (14) for the treated water.

The waste water supply tank is for having waste water a head to flow into the outer casing, above which a waste water supply pipe (15) is open. The tank communicates with the outer casing by means of a leading pipe (19) and it is provided with an overflow to keep a water level constant.

The air supply pipe is connected with an air scattering disc (22) below the lower end of the inner casing.

25 Claims, 10 Drawing Sheets

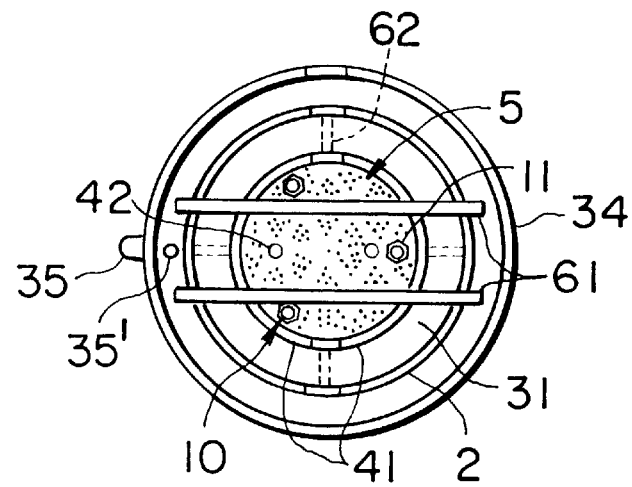
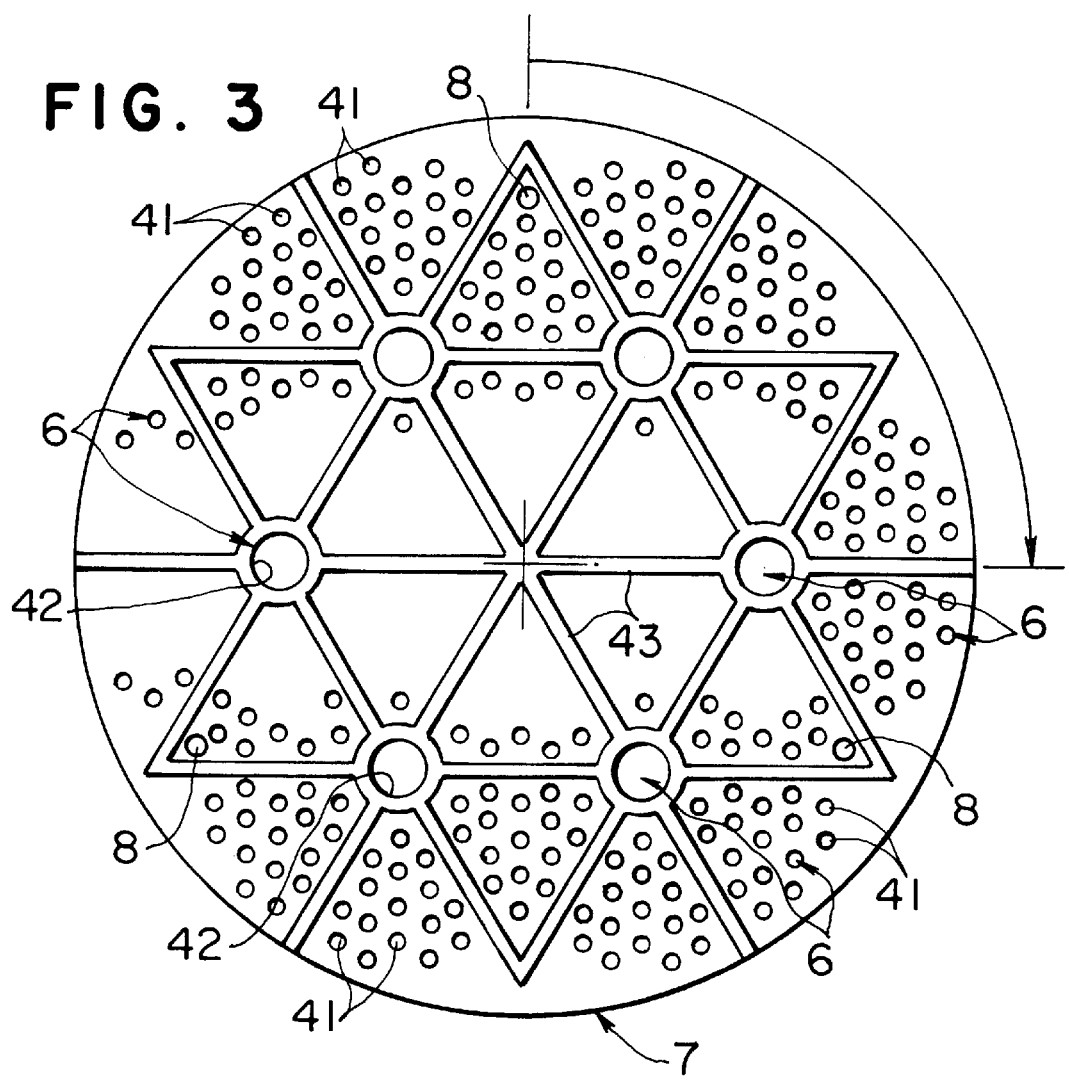

FIG. 10
FIG. 11
FIG. 12
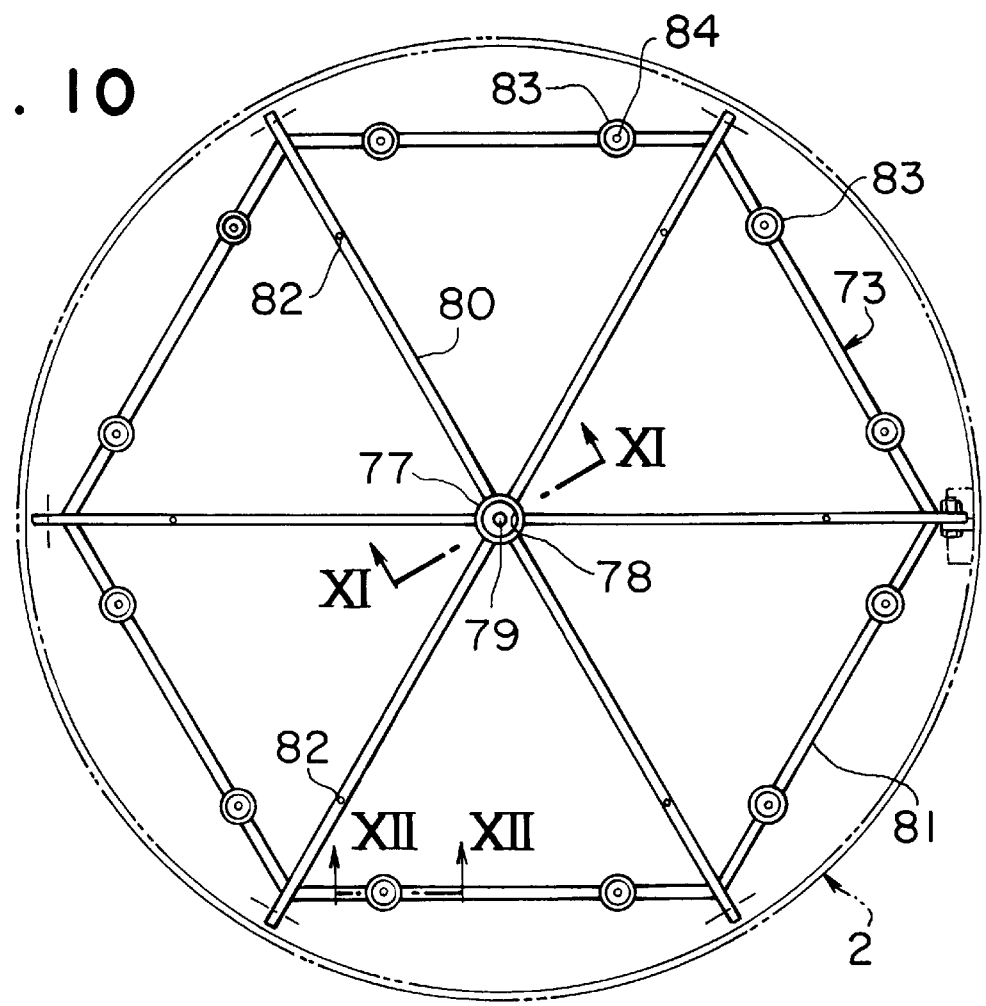
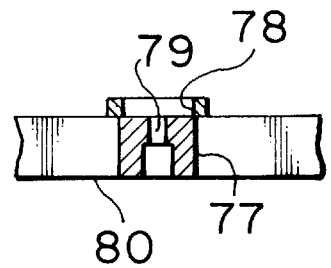
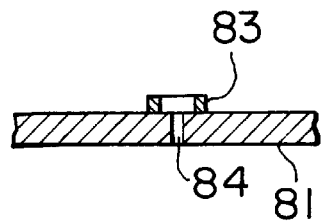

APPARATUS FOR TREATING ORGANIC WASTE WATER UTILIZING MICROORGANISMS

BACKGROUND OF THE INVENTION

1. Field of the Invention

This invention relates to an apparatus for treating organic waste water utilizing microorganisms and more particularly to an apparatus for treating waste water contained organic matter, or the like such as, living drainage, factory drainage, etc., by utilizing microorganisms.

2. Prior Art

A former apparatus for treating organic waste water has, as shown in FIG. 26, a reaction tank 51 to bring floating active sludge germ (a flock of various microorganisms) into contact with waste water. The reaction tank 51 is connected with a settling pond 52 and the waste water contacted with active sludge germ is separated by gravity in the settling pond 52. The active sludge germs precipitate and the supernatant water is to be a treated water.

The settling pond 52 is connected with the reaction tank 51 through a sludge return pump 53. A precipitated active sludge germ is sucked by the pump 53 and returned as a second seed germ into the reaction tank 51.

The operation according to the apparatus is done continuously, and parts of active sludge germs do not precipitate in the settling pond but float in the supernatant water and flow out with the treated water.

The more active sludge germs increase in number in the reaction tank, the speedier waste water is purified. However, as stated above, parts of active sludges flow out the settling pond so that the quantity of active sludge germs in the reaction tank is limited. Further, active sludge germs are not aggregates of only microorganisms which oxidize and resolve organic matters in the waste water, and generally they contain inactive microorganisms which do not directly take part in purifying.

It is, therefore, an object of the present invention to provide an apparatus of less running cost.

Another object of the present invention is to provide an apparatus of high efficiency for purifying waste water.

Further object of the present invention is to provide an apparatus which can be assembled in a suitable scale under its using condition.

SUMMARY OF THE INVENTION

The first apparatus for treating organic waste water utilizing microorganism (hereinafter referred to as [the first apparatus]) of the present invention comprises an inner casing, an outer casing, a waste water supply tank and an air supply pipe.

The inner casing is a vertical type and its upper and lower ends are open and in the inner casing porous carrier discs of polyethylene to which microorganisms are made to take root and which have liquid passages are piled with each space between every two carrier discs.

The outer casing is a vertical type and its bottom is closed by a bottom cap. The outer casing is coaxially arranged with the inner casing with a downward circuit for flowing down liquid between them and has outflow holes for the treated water above the upper end of the inner casing.

The waste water supply tank is for having waste water a head to flow into the outer casing, above which a waste water supply pipe is open. The inside of the waste water tank communicates with the bottom of the outer casing by a leading pipe and has an overflow to keep a water level constant.

The air supply pipe is connected with an air scattering disc below the lower end of the inner casing in the outer casing.

In case of the first apparatus, preferably, the outflow holes are made radially, each inner end face being open to an overflow groove provided along the inner periphery of the outer casing, the overflow groove being formed, by fixing an outer flange at the lower end of a circular board through which orifices pass radially to the inner periphery of the outer casing, the outer end face of the outflow hole being open to a circular gutter, and the circular gutter being provided on the outer circumference of the outer casing and connected with an outflow pipe.

Preferably, the circular board also functions as a guide pipe to lead part of the treated water upward and to overflow it through the orifices.

Preferably, the liquid passages comprise small holes provided all over the surface and large holes which stud the surface of the carrier disc, phases of the mutual large holes of the two carrier discs adjacent upward and downward being shifted with each other in the horizontal plane so that the mutual large holes do not align in a vertical line.

Preferably, the liquid passage is the shape of cone cut off its head, a bore of the liquid passage in the waste water inflow side being smaller than that of outflow side.

Also preferably, on the under plane of the carrier disc barriers are provided.

Preferably, the carrier discs are washed by rising foams and water and prevented from stacking thereto inert organisms, such as, algae, mold, etc., so that micro pores in the carrier discs are not clogged.

The second apparatus for treating organic waste water utilizing microorganism (hereinafter called as [the second apparatus]) of the present invention comprises inner partition walls, an outer casing, a waste water supply tank and an air supply pipe.

The inner partition walls to form substantially an inner casing is arranged respectively along the outer periphery of each regular hexagonal inner carrier disc of polyethylene closely in each space between every two inner carrier discs, and the carrier discs are piled in the same phase with the space. Each inner carrier disc which is porous and has liquid passages is for making microorganisms take root thereto.

The outer casing is coaxially arranged with the inner casing with a circular flowing down passage for liquid between them. The outer casing is closed of its bottom by a bottom cap and of its top by a top plate, respectively. The outer casing has an outflow port for the treated water above the uppermost inner carrier disc and exhaust ports above the outflow port. In the flowing down passage porous outer carrier discs of polyethylene for taking microorganisms root thereto are closely piled with a space between every two discs.

The waste water supply tank is for having waste water a head to flow into the outer casing, above which a waste water supply pipe is open. The inside of the waste water tank communicates with the bottom of the outer casing by a leading pipe and has an overflow to keep a water level constant.

The air supply pipe is connected with an air scattering disc below the lower end of the inner casing in the outer casing.

In case of the second apparatus, preferably, the outflow holes are open at their inner end to an overflow groove provided along the inner periphery of the outer casing. The overflow groove is formed, by fixing an outer flange at the lower end of a circular board through which orifices pass radially to the inner periphery of the outer casing. The outer end face of the outflow hole is open to a circular gutter, and the gutter is provided on the outer circumference of the outer casing and connected with an outflow pipe.

The circular board in this case may be the same structure as of the first apparatus.

Further, in case of the second apparatus, like as in case of the first apparatus, preferably, such structures are adopted which the liquid passages are made as small and large holes and the mutual large holes of the two carrier discs adjacent upward and downward are shifted so as not align in a vertical line and which a bore of the liquid passage in the waste water inflow side is made smaller than that of outflow side.

Preferably, each of the outer carrier discs is made by connecting units in a ring-like form, each of the units being the shape which corresponds to a segment formed by a side of the inner carrier disc, radiations from the center of the inner carrier disc to both ends of the side and a side of the outer casing cut off by the radiations.

Preferably, the inner carrier discs and the units and the mutual units are connected, by fitting each in respective grooves of an H-shaped rail.

The third apparatus for treating organic waste water utilizing microorganisms (hereinafter called as the third apparatus) of the present invention comprises inner partition walls, an outer casing, a waste water supply tank and an air supply pipe.

The inner partition walls to form substantially an inner casing are arranged respectively along the outer periphery of each regular hexagonal inner carrier disc assembly closely in each space between every two inner carrier disc assemblies. The assemblies are piled in the same phase with the space. Each inner carrier disc of the assemblies made of polyethylene which is porous and has liquid passages is for making microorganisms take root thereto.

The carrier disc assembly comprises regular hexagonal discs and rhombic segments in the shape of a trisection of the regular hexagonal disc and is made by arranging the regular hexagonal disc in the center in a honeycomb fashion and the rhombic segments in the empty portion in the outer circumference.

The outer casing is coaxially arranged with the inner casing with a circular flowing down passage for liquid between them. The outer casing is closed of its bottom by a bottom cap and of its top by a top plate, respectively. The outer casing has an outflow port for the treated water above the uppermost inner carrier disc and exhaust ports above the outflow port. In the flowing down passage porous outer carrier discs of polyethylene for taking microorganisms root thereto are closely piled with a space between every two discs.

The waste water supply tank is for having waste water a head to flow into the outer casing, above which a waste water supply pipe is open. The inside of the waste water supply tank communicates with the bottom of the outer casing by a leading pipe and the waste water supply tank has an overflow to keep a water level constant.

The air supply pipe is connected with an air scattering disc below the lower end of the inner casing in the outer casing.

In case of the third apparatus, like as in case of the second apparatus, preferably, the structures stated in the former paragraphs are adopted.

Further, in case of the third apparatus, preferably, each outer carrier discs is made by connecting units in a ring-like form. Each unit is the shape which corresponds to a segment formed by a side of the inner carrier disc, radiations from the center of the inner carrier disc to both ends of the side and a side of the outer casing cut off by the radiations.

Further, preferably, the mutual regular hexagonal carrier discs, the regular hexagonal carrier disc and the rhombic segment, the regular hexagonal carrier disc and the unit, the rhombic segment and the unit and the mutual units are connected, respectively, by fitting each in respective grooves of an H-shaped rail.

In case of the first apparatus, an inner casing, an outer casing, a waste water supply tank and an air supply pipe are prepared. The inner sizes of the inner and outer casings are determined according to quantity and quality of waste water to be treated. These inner and outer casings are preferably cylinder, but one or both of them may take the form of a polygon, and when the outer casing takes the form of fixing the bottom cap to its lower portion, it becomes easy to set the inner casing in the outer casing.

Carrier discs of polyethylene to which microorganisms are made to take root and which have liquid passages are prepared. The material is the same as adopted in the patent publication No.8-10557 filed by the present applicant. The material is made of a high density polyethylene and is sold under the article name [POLEX] (the trade mark of TECH-NOLOGIES CO., LTD.)

The number of the carrier discs is determined according to a property of waste water and it is preferable to suit the outer shape of the carrier disc to the sectional shape of the inner casing.

The necessary numbers of the carrier discs are piled with each space between every two carrier discs in the inner casing. This piling is easy when done as follows.

Let the necessary number of the carrier discs align and let a spacer put in between every two carrier discs. And let bolts pass through bolt holes of each carrier disc and spacers in order for making a disc assembly.

Supporters such as flanges, pins, etc., are formed on the inner periphery of the lower portion of the inner casing and let the disc assembly be supported by the supporters, by inserting the disc assembly into the inner casing through its uppermost opening plane.

If it is hard to have disc assembly be supported directly on the supporters, let a screen be put on the supporters and let the disc assembly be supported onto the screen.

It is preferable to make microorganisms take root to a carrier disc as it is, but they may be made to take root to a disc assembly form.

The inner casing is coaxially placed in the outer casing. The inner sizes of the inner and outer casings are determined so as to form a flow down circuit for liquid between both planes facing each other, that is, between sides and the upper and lower ends. The coaxial placement of both casings can be done, for example, by protruding pins from the inner wall of the outer casing to its center. Also, the setting of the inner casing in relation to the outer casing in the axial direction can be done, by providing ledges for receiving the inner casing on or by protruding arms from the inside of the outer casing. At all events, by this, the waste water flown into the bottom portion of the outer casing rises into the inner casing through its lower opening. The waste water overflows, by supplying air therein, at its upper end and flows down in the flow down circuit to the bottom portion of the outer casing, and then the waste water is to repeat a travel entering again the inner casing through its lower opening and rising.

The outer casing has an outflow ports for the treated water, which are open at the upper portion than the overflow plane at the upper end of the inner casing.

"Which is open" described above includes in cases of the outflow ports being directly open and being led by means of other passage.

By varying the difference between the level of the outflow ports and the overflow plane, degree of contact for treating waste water, that is, the volume of circulation can be varied.

There are three ways of doing the variation.
(1) Let a head of waste water to be fed in the outer casing vary.
(2) Let volume of air to be supplied in the inner casing through the air supply pipe adjust.
(3) Let a level of an overflow hole of the inner casing vary upward or downward.

The adjustment is preferable to be adjustable type when quality and quantity of waste water to be treated, but it may be fixed type when invariable.

In a ward, the ratio between quantities of liquids flowing out through the outflow port at the uppermost and circulating between the inner and the outer casings is to be number of turn.

This ratio is easily settled at high so that efficiency rises, and even an apparatus of small size can effectively be applied.

The waste water supply tank is for having waste water a head to flow into the outer casing. Above the tank a waste water supply pipe is open to continuously supply waste water therein and an excess waste water is drained outward at the overflow. The supplying may be done by natural flowing down or by pumping up from a waste water sink.

When let the overflow open to a sink, waste water can be utilized cyclically. The inside of the waste water tank communicates with the bottom of the outer casing by a leading pipe, and when let a valve on the way open, the waste water given a head flows out of the waste water supplying tank into the outer and the inner casings through the leading pipe.

And, the air supply pipe is connected at one end with an air supply source such as blower and at the other end with an air scattering disc below the lower end of the inner casing in the outer casing. The air scattering disc is an ordinary type which emits air supplied thereto from the face as foams.

When use the first apparatus, air is fed through an air supply pipe. From the upside of the air scattering disc, numberless small foams rise and enter into the inner casing and rise through the liquid passages of the carrier discs. By this feeding in of foams, the water level in the inner casing rises, and waste water overflows at the open plane at the upper end of the inner casing.

In numberless pores in each carrier disc, numberless microorganisms are made to take root, and when waste water passes through the liquid passages organic substances contained therein are made a prey of the microorganisms. The waste water is purified gradually during its circulation between the inner and the outer casings, and the purified treated water is, by overflowing through the outflow ports, taken out of the outer casing.

The outflow holes are made radially. The inner end planes of the outflow ports are open to an overflow groove provided along the inner periphery of the outer casing. The overflow groove is formed, by fixing an outer flange at the lower end of a circular board through which orifices pass through radially to the inner periphery of the outer casing.

If the inner ends of the orifices are open above the overflowing plane of the inner casing, the inner ends of the outflow ports may be located under the overflowing plane of the inner casing.

The outer end faces of the outflow holes are open to a circular gutter, which is provided on the outer circumference of the outer casing and connected with an outflow pipe.

When made like this, by settling the height from the overflowing plane of the inner casing to the orifice, quantity of circulation for treating waste water can be varied.

In case the liquid passages comprise small holes provided all over the surface and large holes which stud the surface of the carrier disc, phase of the mutual large holes of the two carrier disc adjacent upward and downward being shifted with each other in the horizontal plane so that the mutual large holes do not align in a vertical line, part of waste water rises with less resistance and the number of circulation of waste water increases, so that it is useful for purifying the waste water and the oxygen melted therein is effectively supplied to microorganisms in the small holes. Also the air stays long, therefore, the oxygen melted therein increases and acts effectively on microorganisms for their living, and let waste water snake to increase a chance of contacting waste water with microorganisms.

In case, the liquid passage is the shape of a cone cut off its head, a bore of the liquid passage in the waste water inflow side being smaller than that of outflow side, the frictional resistance to the water including foams becomes less also air locking can be prevented.

In case, on the under plane of the carrier disc barriers are provided, the rising flow of the water including foams becomes equalized and the time for keeping air is elongated.

In case, the carrier discs are washed by rising foams and water and prevented from stacking thereto inert organisms, such as, algae, mold, etc., so that micro pores in the carrier discs are not clogged, life environment of microorganisms is kept comfortably and the carrier disc can be used long.

In the second apparatus, inner partition walls, an outer casing, a waste water supply tank and an air supply pipe are provided. With respect to the waste water supply tank and the air supply pipe the explanation is omitted as the structure and function of them are not different from as of the first apparatus. Also even in other structure as the similar structural parts exist as of the first apparatus, the explanation of that parts are omitted.

Though the inner disc of the second apparatus is the same material as of the carrier disc of the first apparatus also has liquid passages, the shape of the inner carrier disc is regular hexagonal and the outer carrier disc also made of the same material as of the carrier disc of the first apparatus. A liquid passage in this case is for preventing waste water from naturally flowing down by the outer carrier disc and for multiplying a chance of contacting organic substance with waste water.

The inner partition walls are arranged respectively along the outer periphery of each regular hexagonal inner carrier disc assembly closely in each space between every two inner carrier disc assemblies. [the outer periphery] here stated includes in case of the outer periphery of a plane of the carrier disc and of an outer portion of a plane of the outer carrier disc which is connected with a carrier disc. Also [being arranged closely in each space] means to form by the inner partition wall an enclosed space between two inner discs adjacent upward and downward direction.

Accordingly, when keeping on piling carrier discs in order and inserting the inner partition wall in each space, finally the inner partition walls forms substantially a cylinder. It executes substantially the same function as of the inner casing of the first apparatus.

The outer casing is coaxially arranged with the inner casing with a downward circuit for liquid between them. As the inner partition wall is arranged along the outer periphery of the regular hexagonal inner carrier disc, the outer casing is also to be arranged coaxially with carrier disc. The outer casing is closed of its bottom by a bottom cap and of its top by a top plate. The outer casing has an outflow port for the treated water above the uppermost inner carrier disc and exhaust ports above the outflow port.

In the first apparatus, as the upper end of the outer casing is made of an open type, the exhaust ports are not needed, but in the second apparatus, as there is the top plate, the exhaust ports are provided. If not the exhaust ports, in case the apparatus is settled outdoors, rain or snow mixes with waste water and environment around microorganisms varies and microorganisms die or become lost their activities. Therefore, the expected treatment of waste water can not become done.

In the circuit between the outer casing and the inner partition wall porous outer carrier discs of polyethylene for taking microorganisms root thereto are closely piled with a space between every two discs.

In the second apparatus let the organic waste water to be treated circulate at high speed upward at the central aerating portion of the apparatus and downward in the downward circuit in the outer circumference. The regular hexagonal carrier discs and the outer carrier discs (porex sheets) taken root with active sludge organisms are arranged with a space between two discs in the aerating portion enclosed by the inner partition wall which forms substantially the inner casing and in the downward circuit where waste water flows down, respectively, and during the frequent contact with the circulating water at each step, the organic substances in the waste water are taken out.

Quantity and treating speed of organic matter to be treatable are proportioned to the absolute volume of the fixing organisms which live within both the carrier discs, so that the more capacities of both the carrier discs the better, but from a structure of apparatus and an economical efficiency a rational capacity is required naturally.

In particular an aerating portion is, on various elements such as a height of a pile, sectional area, a shape, of the inner carrier disc, demanded a rational size to be obtainable a necessary and enough supply of air and the rising of water level necessary for circulating at high speed. Accordingly, to increase capacity a necessary capacity is to be kept in the downward circuit in the outer circumference, and in this case, also a rational sectional area and capacity which can be obtained an even flow and can apply effectively whole outer carrier discs piled must be required.

As in the central aerating portion (the inner casing) the circulating water and air from aeration mix and rise coming into contact with the inner carrier discs, a time for substantially contacting the inner carrier discs with waste water shorten relatively.

When the waste water flows into the outer circumferential portion the foams are separated therefrom, and only the waste water flows down, coming into slow contact with the outer carrier discs, in the downward circuit in the outer circumference.

When compared of the contacting times of the waste water with the inner carrier discs and with the outer carrier discs, it becomes about 20 in the downward circuit to in the aerating portion.

Also when compared the substantial capacities of the inner carrier discs with that of the outer carrier discs, it is preferable that the downward circuit has about 1.35 times to the aerating portion.

When considered the comparison of the numerical value stated above, the greater part of treating function in the second apparatus is to be in the downward circuit in the outer circumstances. The inner carrier discs piled in the central aerating portion have the functions for raising melting speed of oxygen in the air in the circulating water and the water level to obtain a circulation at high speed, so that they have, in the structure of the second apparatus for treating waste water, they have a necessary indispensable meaning.

It is not possible to achieve such a treatment at high speed until the central aerating portion and the downward circuit of the outer circumference act together.

In case of the second apparatus, the outflow port is open at its inner end to an overflow groove provided along the inner periphery of the outer casing, the overflow groove being formed, by fixing an outer flange at the lower end of a circular board through which orifices pass radially to the inner periphery of the outer casing, the outer end face of the outflow port being open to a circular gutter.

When made like this, by adjusting the height from the overflowing plane of the inner case to the orifice, the circulating quantity to be treated can be varied and the treated waste water can be drained directly to the outflow pipe through the outflow ports.

Also, in case of the second apparatus, with respect to the circular board and the liquid passages of the inner carrier discs, the explanation of the first apparatus is applied.

When each of the outer carrier discs (72) is made by connecting units in a ring-like form, each of which is the shape corresponding to a segment formed by a side of the regular hexagonal inner carrier disc, radiations from the center of the inner carrier disc to both ends of the side and a side of the outer casing cut off by the radiations, it becomes easy to coaxially arrange the central aerating portion with the outer circumferential downward circuit for flowing the waste water downward. The unit is to be the shape of a fan when the outer casing is cylinder, and a trapezoid when a similar figure as the inner carrier disc.

When the regular hexagonal inner carrier discs and the units and the mutual units are connected, by fitting each in respective grooves of an H-shaped rail, respective connecting portions are closely contacted and also it becomes easy to connect them.

The third apparatus of the present invention differs from the second apparatus in arrangement of the inner and the outer carrier discs and the explanations are made in respect of these points.

The inner carrier discs becomes an assembly, which comprises regular hexagonal discs and rhombic segments in the shape of a trisection of the regular hexagonal disc and is made by arranging the regular hexagonal disc in the center in a honeycomb fashion and the rhombic segments in the empty portions in the outer circumference.

There are cases one or two or more outer carrier disc(s) is(are) applied to a side of the carrier disc assembly.

This case is applicable for enlarging an apparatus.

Also, in case of the third apparatus, like as the second apparatus, it can be applied of the structures and functions stated in the former paragraphs.

BRIEF DESCRIPTION OF THE DRAWINGS

FIG. 2 is a plan view of a parts of the inner and the outer casings 1 and 2.

FIG. 3 is the base view of the carrier disc 7 for making microorganisms take root therein.

FIG. 10 is a plan view of the receiving frame 73.

FIG. 11 is a section along line 11—11 of FIG. 10.

FIG. 12 is a section along line 12—12 of FIG. 10.

DETAILED DESCRIPTION OF THE PREFERRED EMBODIMENT

Figure 1:
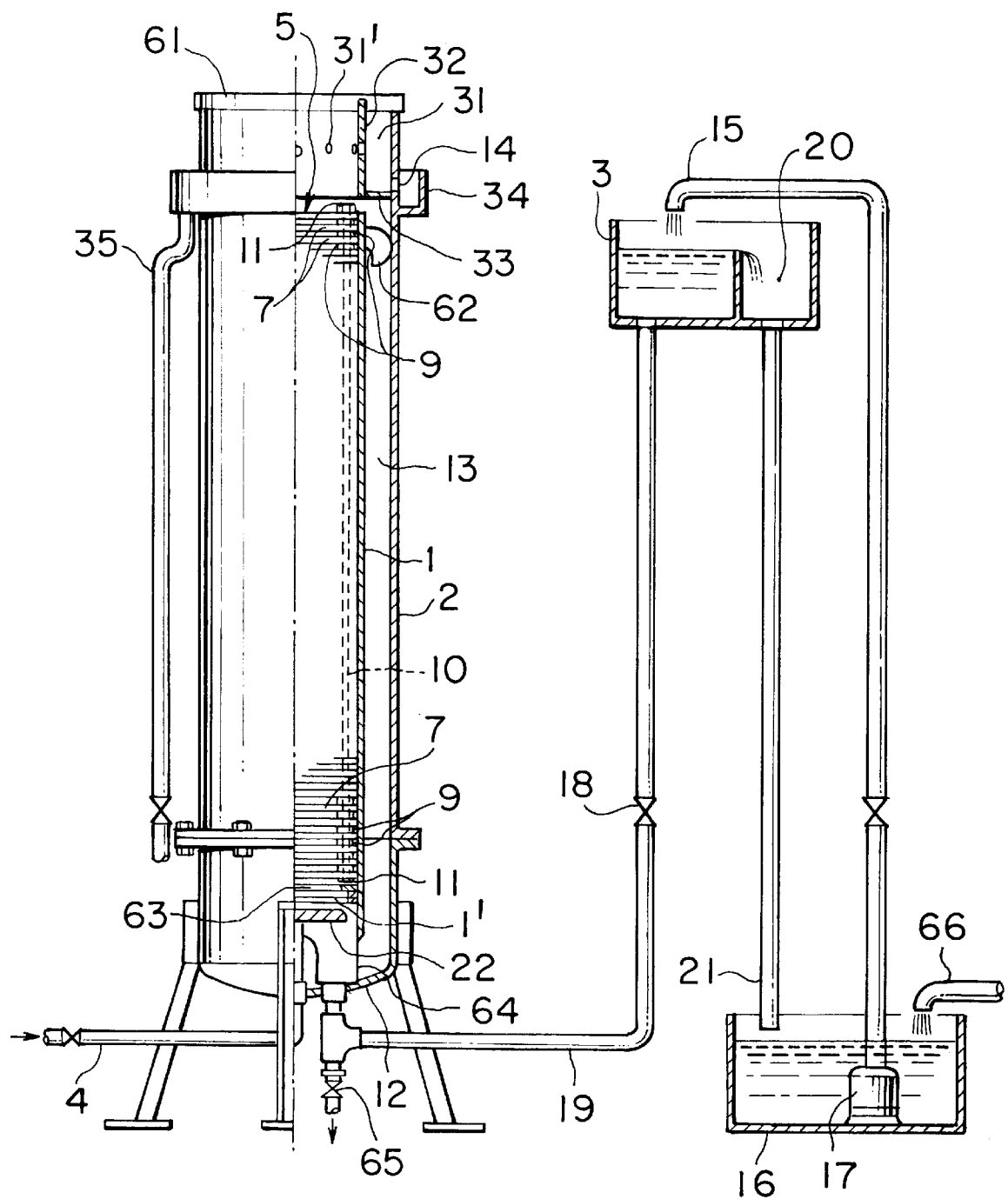
FIG. 1 is a partially cut off side view which illustrates one embodiment of the apparatus for treating waste water utilizing microorganisms of the present invention.
Figure 4:
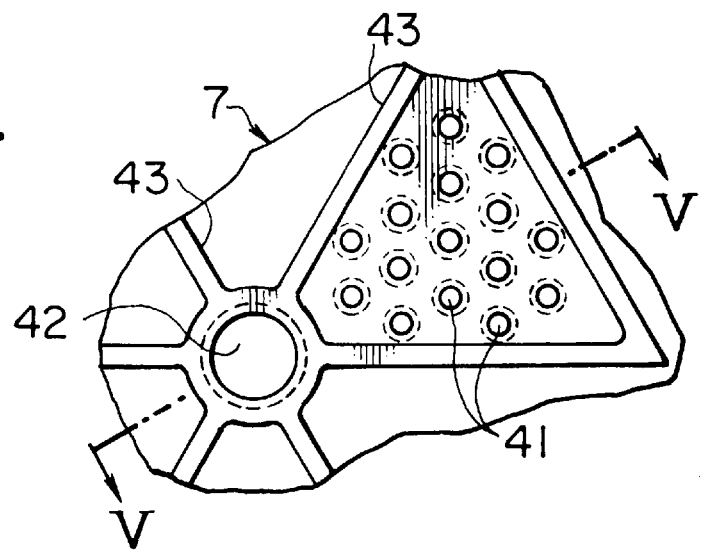
FIG. 4 is a partially enlarged view of FIG. 3 showing the small holes 43 in limited area.

In the following explanations, through the whole figures the same numeral designate the same or corresponding portion.

FIG. 1 through FIG. 6 show an embodiment of the first apparatus of the present invention.

The first apparatus comprises an inner casing 1, an outer casing 2, a waste water supply tank 3 and an air supply pipe 4. The inner casing 1 is a vertical cylinder and its upper and lower ends are open. The inner casing 1 is provided with a disc assembly 5 therein. The disc assembly 5 is such that carrier discs to which microorganisms are made to take root are porous and have liquid passages 6, and are stacked piled by means of bolts 10 which pass through their bolt holes 8 and the disc assembly is held together with end spacers 9 inserted between every two carrier discs and nuts 11.

The carrier disc 7 shown in the drawings is a form of a circular disc. The carrier disc is made of an intensified polyethylene and the material is sold under the article name [POREX] (a trade mark of TECHNOLOGIES CO., LTD.)

The outer casing 2 is a vertical cylinder and its bottom is closed by a bottom cap 12. The outer casing 2 is arranged coaxially with the inner casing 1 with a downward circuit 13 between them. The outer casing 2 has outflow ports 14 for the treated water above the opening plane serving the purpose of an overflow at the upper end of the inner casing 1.

The waste water supply tank 3 provides a certain head and is provided on an appropriate outside position of the outer casing 2. Above the tank 3 a waste water supply pipe 15 is open and waste water is supplied continuously therein. The other end of the waste water supply pipe 15 may be connected with a passage of waste water or, as shown in the drawings, with a waste water sink 16 through a pump 17. Waste water is to be fed to the sink 16.

The inside of the waste water supply tank 3 leads to the inside of the outer casing 2 through the bottom cap 12 by means of a leading pipe 19 with a valve 18. The waste water supply tank 3 is provided with an overflow 20 and a drain pipe 21 is made to open to the waste water sink 16.

Waste water is supplied continuously in the waste water tank 3 through the waste water supply pipe 15 and excess waste water is drained outward at the overflow 20. When valve 18 is open, the waste water is given a head and flows out of the waste water supply tank 3 into the outer casing 2 and the inner casing 1 through the leading pipe 19.

The air supply pipe 4 is at one end connected with an air scattering disc 22 located under the lower end opening plane of the inner casing 1 in the outer casing 2 and at the other end connected, as usual, with an air supplying machine such as a blower (not shown).

The air scattering disc 22 is an ordinal type which is placed on sale.

In using the apparatus let microorganisms take root to the carrier discs 7. To take root is preferably done when the carrier disc is in itself but it may be done when the carrier discs are in a state of a disc assembly.

When the valve 18 opens waste water flows by its head into the outer casing 2, the inner casing 1 and the downward circuit 13.

At this point, air is fed, by starting a blower and the like, to the air scattering disc 22 through the air supply pipe 4. The air becomes small foams as usual when it passes through the air scattering disc 22 and rises evenly in the inner casing 1.

As the volume of foams increases, the level of the waste water in the inner casing 1 rises, and the waste water overflows at the opening plane at the upper end of the inner casing and flows in the downward liquid flow circuit 13 between the side walls of the outer casing 2 and the inner casing 1.

The foams are at this moment separated from the waste water and discharged in atmosphere through the opening plane at the upper end of the outer casing 2. The waste water overflowed in the downward circuit 13 between the side walls of the outer casing 2 and the inner casing flows down the downward circuit 13 and again rises with foams in the inner casing 1. Thus the waste water repeats the stroke.

The waste water contacts, when it passes through the liquid passages 6 of the carrier disc 7, with the microorganisms taken root therein and the organic matters contained in the waste water are made a prey of the microorganisms and the waste water is gradually purified.

The number of circulating times of waste water is suitably decided as waste water is purified. The decision is done, by performing one work or two or more assembled works such as settling a head of the waste water supplied from the waste water supply tank 3, adjusting a volume of air from the air supply pipe 4, varying the height of the orifice 31' of the outer casing 2.

With respect to quality of the waste water, it can cope by adjusting the number of the carrier discs 7 or by arranging the treating apparatuses in series and also with respect to quantity of waste water it can cope by planning the capacities of the outer casing 2 and the inner casing 1 for fitting thereto or by arranging the treating apparatuses in parallel.

During the operation of the treating apparatus, part of the purified waste water flows continuously through the outflow ports 14 out of the outer casing 2 and a proportionate quantity of waste water flows continuously in the outer casing 1 from the waste water supply tank 3.

The outflow ports 14 are made radially. Each inner end plane of the outflow ports 14 is open to an overflow groove 31 which is provided along the inner periphery of the outer casing 2. The overflow groove 31 is formed, by fixing an outer flange 33 at the lower end of a circular board 32 through which orifices 31' pass radially to the inner periphery of the outer casing 2. The outer end planes of the outflow ports 14 are open to a circular gutter 34, which is provided on the outer circumference of the outer casing 2 and connected with an outflow pipe 35.

When made like this, it can be decided, by adjusting the height between the opening plane at the upper end of the inner casing 1, that is, an overflow plane of the waste water and the orifices 31' of the overflow groove 31, quantity of circulating waste water.

Phases of the mutual liquid passages 6 of two carrier discs 7 adjacent upward and downward are shifted with each other in the horizontal plane so that the mutual liquid passages 6 do not align in a vertical line, that is, in case the liquid passages 6 of the carrier discs 7 are located as shown in FIG. 3, when one of the carrier discs 7 is rotated in a 90-degree to the arrow, the liquid passages 6 of one of the carrier discs 7 are so shifted within an area against the other carrier disc as not to pass through with each other in a vertical line. Thus, the air stays long, therefore, oxygen melted therein increases and acts effectively on microorganisms for their living, and by letting the waste water snake, a chance of contacting the waste water with microorganisms increases.

The liquid passages 6 comprise small holes 41 provided all over the surface and large holes 42 which stud the surface of the carrier disc 7.

When made like this, part of the waste water rises through the large holes 42 with less resistance and the number of circulations of the waste water increases, so that it is useful for purifying the waste water, and in the small holes 41 oxygen melted therein and energy source are effectively supplied to the microorganisms taken root therein.

Figure 5:
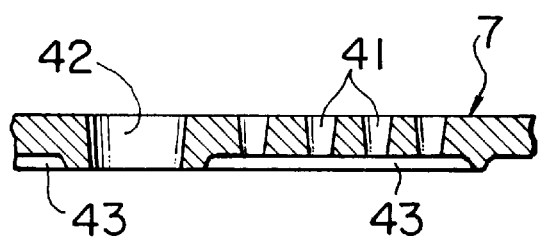
FIG. 5 is a section along line 5—5 of FIG. 4.

Each liquid passage 6 is, as shown in FIG. 5, the shape of a cone cut off its head, a bore of the liquid passage in the waste water inflow side being smaller than that of outflow side, the frictional resistance to the water including foams becomes less and also air locking can be prevented.

On the under plane of the carrier disc 7 barriers 43 are provided. By this, it becomes equalize the rising flow of the water including foams and the time for keeping air is elongated.

Figure 6:
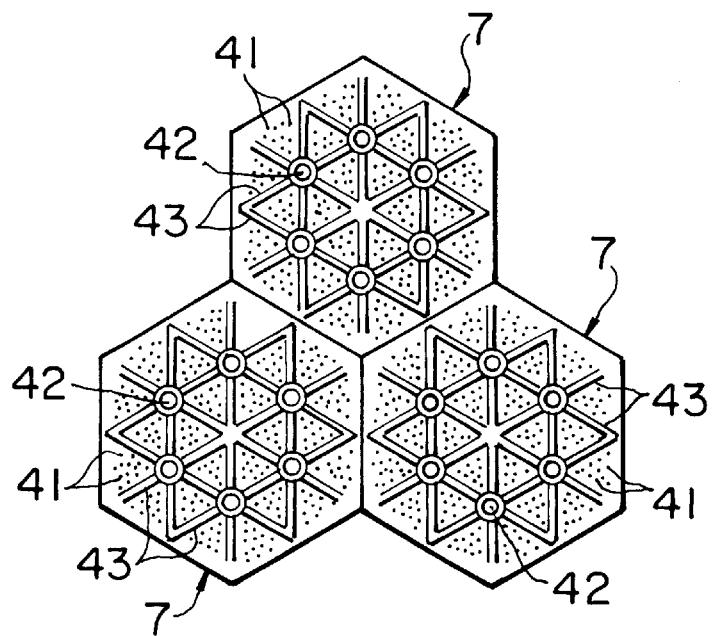
FIG. 6 is an explanatory view of the honeycomb like carrier disc when in use.

The carrier disc 7, as shown in FIG. 6, is the regular hexagonal shape which is connectable in a honeycomb fashion. Therefore it can cope with the variation of quantity of waste water to be treated, by connecting the carrier discs 7 and securing a necessary area.

The carrier discs 7 are washed by the rising foams and water and prevented from stacking thereto inert organisms, such as, algae, mold, etc. Accordingly, as micro pores in the carrier discs 7 own are not clogged, life environment of microorganisms is kept comfortably and it can be used long the carrier discs.

And, in the drawing, bars 61 are fixed on the top of the outer casing 2 and spanned over the overflow groove 31. Arms 62 protruding radially from the outer periphery at the upper end of the inner casing 1 are for centering the inner casing 1.

A base 63 is for supporting carrier discs. Legs 64 are provided at lower end of the inner casing 1. A drain 65 and a waste water inflow pipe 66 are shown in FIG. 1.

Figure 7:
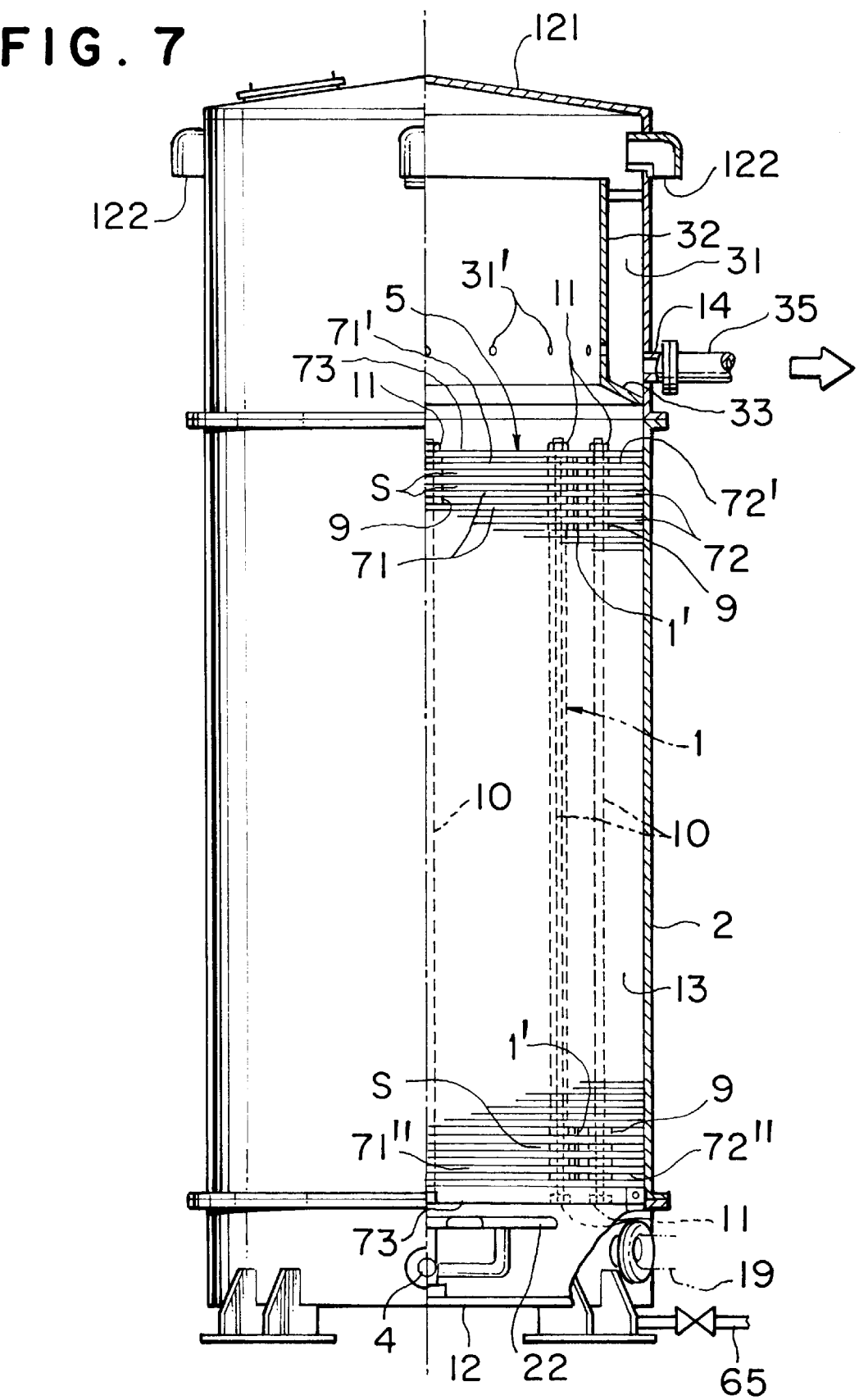
FIG. 7 is a partially cut off side view which illustrates one embodiment of the second apparatus of the present invention.
Figure 8:
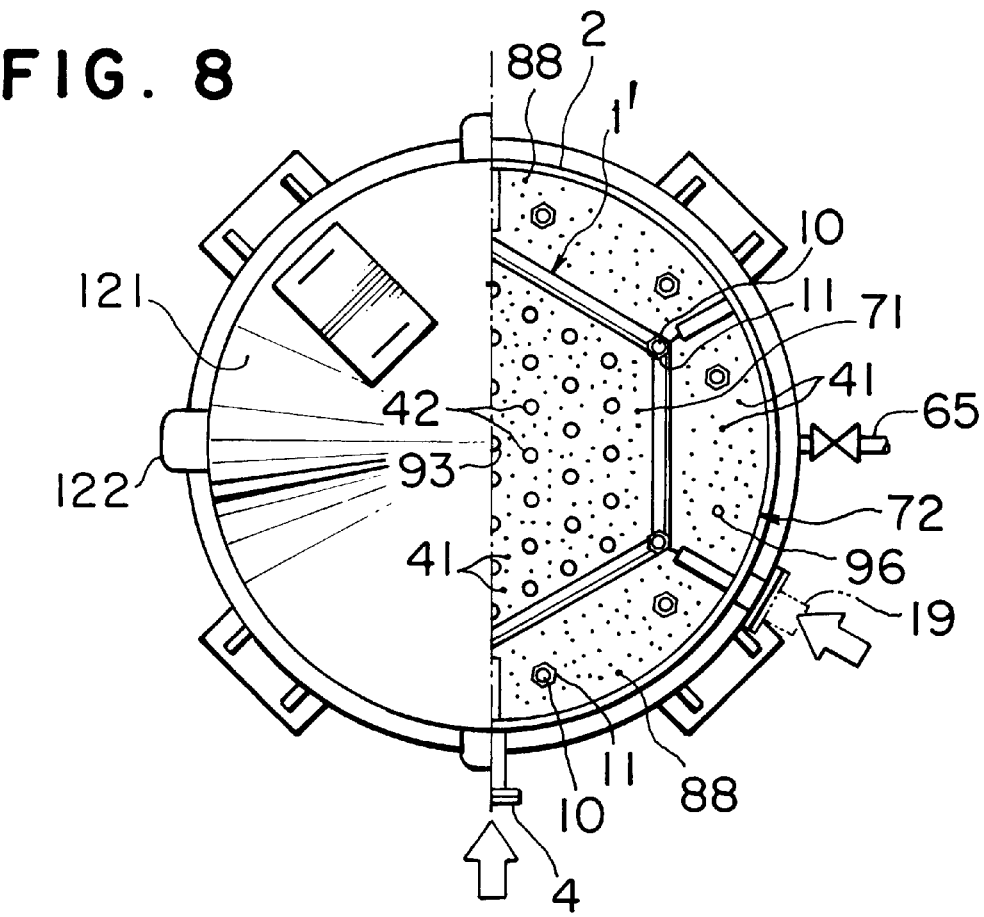
FIG. 8 is a partially cut off plan view of FIG. 7.
Figure 9:
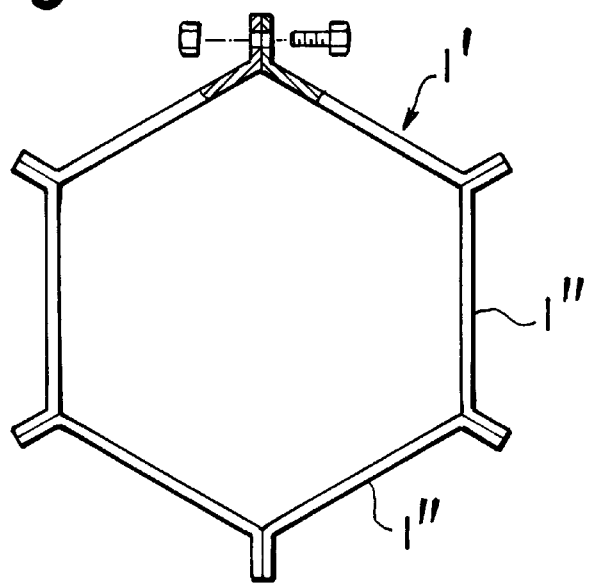
FIG. 9 is a plan view showing the detail of the inner partition wall 1' which is partially cut off.
Figure 13:
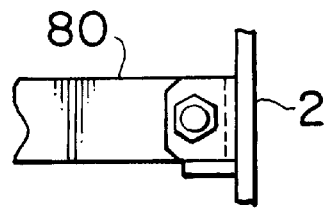
FIG. 13 is a detail of the supporting structure of the receiving frame 73 to the outer casing 2.

FIG. 7 through FIG. 9 show an embodiment of the second apparatus of the present invention.

Here described are mainly on the different points from the first apparatus.

The inner carrier discs 71 are hexagonal in shape and piled in the same phases with a spacer between every two discs, and around the outer circumferences of the inner carrier discs 71 the outer carrier discs 72 are piled with a spacer between every two discs.

The inner partition wall 1' is arranged between the outer carrier discs 72, 72 and forms a closed space S between them.

The inner partition wall 1' may be formed in advance of a regular hexagonal cylinder having an axial length fitting in with a space between the outer carrier discs 72, 72.

Also, when the inner partition wall 1' is, as shown in FIG. 9, formed in order by connecting six segments 1" each of which is a board of length fitting for a side of the regular hexagon and formed outward ears at its both ends with each bolt hole through them, by means of bolts and nuts, it is easily fitted in an apparatus of a large scale.

The inner partition wall 1' is in the middle of an assembly in a state merely put between the outer carrier discs 72, 72 adjacent upward and downward.

When let bolts 10 pass through the uppermost outer carrier disc 72' and the lowermost carrier disc 72" and let nuts 11 fasten, the inner partition wall 1' fastens closely on the upper and the lower carrier discs 72 and closes the inner space S. Thus, the inner partition walls 1', putting the outer carrier disc 72, forms an apparent inner casing as of the first apparatus, and the waste water which rises on aerating function naturally passes through the inner carrier discs 71.

One embodiment of a method to assemble the inner and the outer carrier discs 71 and 72 is as follows.

Figure 14:
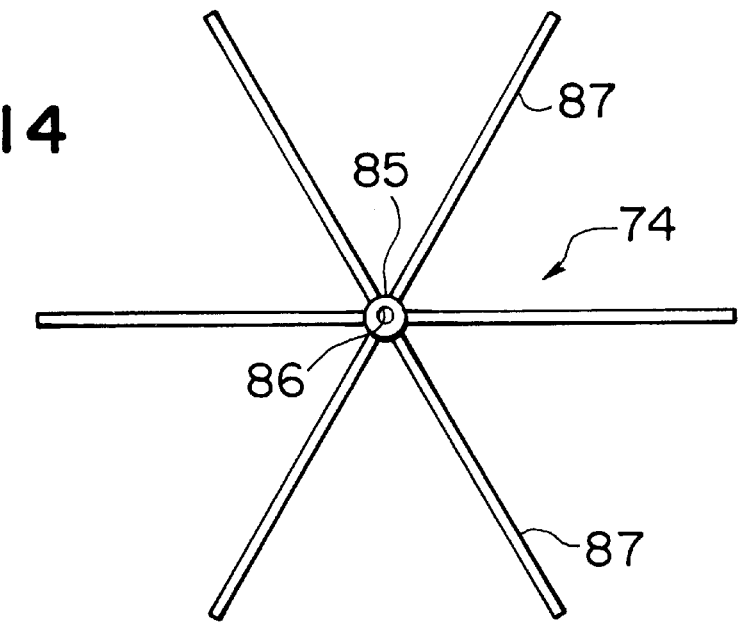
FIG. 14 is a plan view of the restrainer 74.
Figure 15:
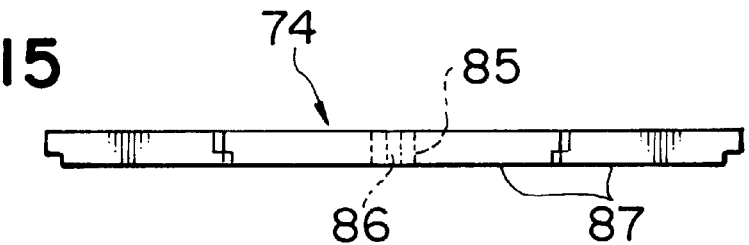
FIG. 15 is a side view of the FIG. 14.

In case of the inner carrier disc 71, receiving frames 73 of regular hexagons (FIGS. 10–13), restrainers 74 (FIGS. 14, 15), spacers 75, 76 (FIGS. 16–19) and bolts 10 and nuts 11 as of the first apparatus are used. Each receiving frame 73 has a boss 77 at its center, which is provided on the upper plane with a receiver 78 for a spacer 75.

Through the boss 77 a hole 79 for the bolt 10 passes. From the boss 77 six arms 80 protrude radially at an even angle and each end of the arms 80 are connected with ledges 81.

Each arm 80 is longer than the size from the center of the inner carrier disc 71 to one of its apexes and holes 82 for bolts 10 are made just outward of the apexes. Each ledge 81 is for supporting the outer carrier disc 72 and provided on its upper plane with saucers 83, and in their axial lines holes 84 for the bolts 10 pass through the ledges 81.

Each restrainer 74 has a hole 86 passing through their central boss 85 for the bolt 10 and from the boss 85 six arms 87 protrude radially at an even angle, and the outer end of each arm 87 comes near to the corner of the inner carrier disc 71.

Figure 16:
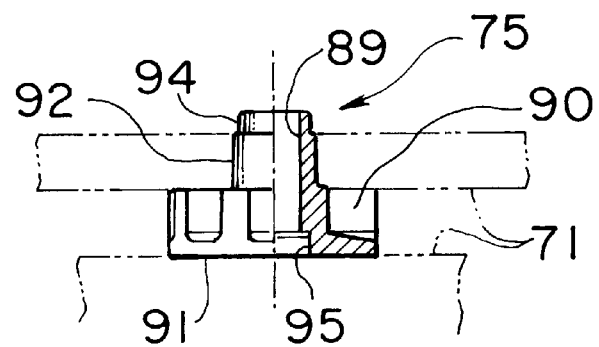
FIG. 16 is a side view of the spacer 75 a half of which in section.
Figure 17:
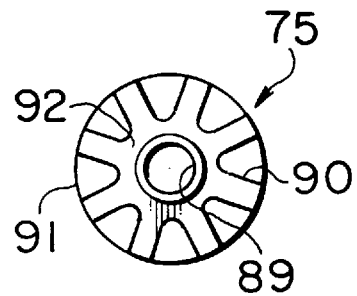
FIG. 17 is a plan view of FIG. 16.

FIGS. 16 and 17 show the spacer 75. The spacer 75 is for receiving the inner carrier disc 71 of wide area and the spacer 76 is for a unit (FIG. 8) of lesser area to form the outer carrier disc 72. It is a mountain like in section, through which an axial hole 89 for the bolt 10 passes and the base plate 92 protrudes upward in a size fitting to a thickness of the inner carrier disc 71 and is for fitting closely in a hole 93 (refer also to FIG. 8) of the inner carrier disc 71. A protruding portion from the upper end of the mountain like portion 92 becomes a reductive diameter portion 94 and at the lower end of the axial hole 89 a larger diameter portion 95 of a length in which the reductive diameter portion 95 of another spacer 75 closely fits in is provided.

Figure 18:
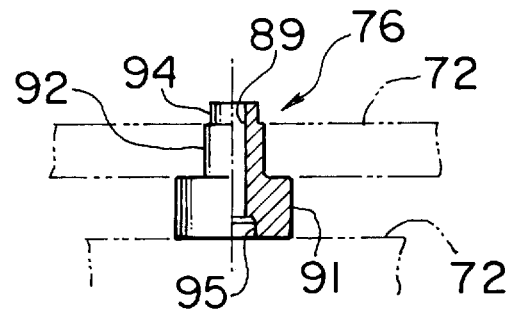
FIG. 18 is a side view of the spacer 76 a half of which in section.
Figure 19:
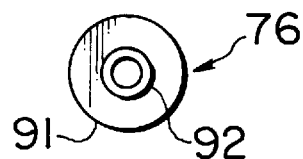
FIG. 19 is a plan view of FIG. 18.

The spacer 76 shown in FIGS. 18 and 19 is almost same structure as the spacer 75. Only, there is not a rib 90 to the base plate 91, the outer diameter of the base plate being small and the diameters of the mountain like portion 92 and the axial hole 89 also being shortened.

The bolt 10 and the nut 11 are the same as used in the first apparatus.

Let the receiving frame 73 put on a lifting cylinder (not shown) and getting the base portion 91 of the spacer 75 into the receiver 78 of the boss 77. Let the inner carrier disc 71 put thereon, coaxially with the receiving frame 73 and facing each corner to each arm 80 of the receiving frame 73, and let the mountain like portion 92 of the spacer 75 fit in the central hole 93.

Next, let the larger diameter portion 95 of the base portion 91 of the same spacer 75 fit in the reductive diameter portion 94 of the mountain like portion 92 of the spacer 75, and let the hole 93 of another inner carrier disc 71 of a like structure fit on the mountain like portion 92 of the spacer 75. The hole 93 can not pass through the base portion 91 and the inner carrier disc 71 stops coming into contact with the upside of the base portion 91, that is, the height of the base portion 91 fix the height of the space S between two inner carrier discs 71.

From here forth by doing like this, they are assembled in order. When it becomes the height which excesses the area of working, let the cylinder lower each time.

When the uppermost inner carrier disc 71' has been set, let the restrainer 74 put thereon and then let the hole 86 align with the axial hole 89 of the spacer 75. By letting the bolt 10 pass there through and letting the nuts 11 fasten at its both ends, a disc assembly 5 (FIG. 7) is formed. The inner carrier discs 71 are not flapped by buoyancy. It may be assembled by letting the bolts 10 stand in advance on a cylinder and the inner carrier discs pass through the bolts. It is similar in case of the outer carrier discs 72 and also it is applied in the following case.

Next, in case of the outer carrier disc 72, the receiving frame 73 is used together with the inner carrier disc 71. Also at suitable position of the outer carrier disc 72 holes 96 (refer also to FIG. 8) for the bolts 10 are made.

Assembling is similarly done as the inner carrier discs 71 through the spacers 76. In case of the outer carrier discs 72, as buoyancy by air does not act, the restrainer 74 is not needed. The outer carrier discs 72 are restrained directly by means of the nuts 11 at both ends of the bolts.

Figure 20:
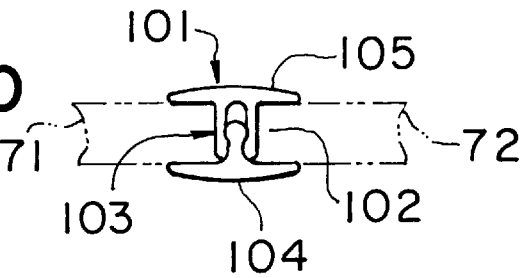
FIG. 20 is an end view of the H-shaped rail.

FIG. 20 shows an H-shaped rail 101. The rail 101 is used for connecting the outer carrier discs 72 along the outer circumference of in the same plane with the inner carrier disc 71. In each groove 102 of both sides of the rail, the inner carrier disc 71 and the outer carrier disc 72 (when the outer carrier disc 72 is formed with units 88, mutual respective unit 88) fit therein. When the H-shaped rail is formed with a male and female members 104, 105 which fit in with each other at their webs 103 which are adjustable of their lengths, it can carry out close contact of both carrier discs with the rail 101 when they fitted in each groove 102, respectively.

Figure 21:
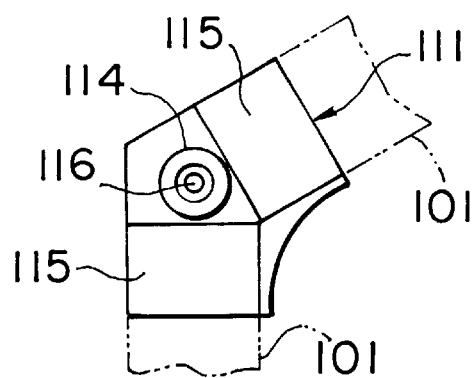
FIG. 21 is a plan view of the corner spacer 111.
Figure 22:
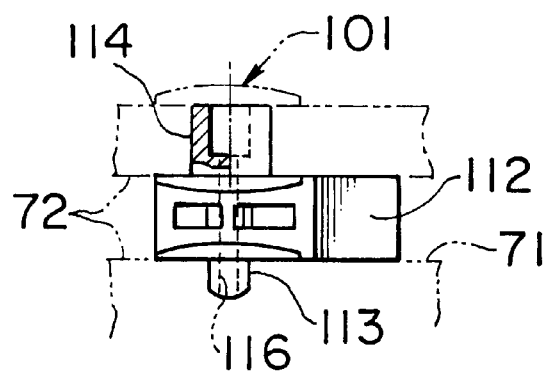
FIG. 22 is a side view of FIG. 21.

FIGS. 21 and 22 show a corner spacer 111 which is applied to a corner of the inner carrier disc 71. The corner spacer 111 is provided with a spacing portion 112, a protrusion 113 on the underside of the portion, a protrusion receiver 114 aligned with the protrusion 113 and protruding from the upper plane of the portion 112, and a couple of rail receivers 115 spread Ed from the axial line of the protrusion 113 at right angle with a 120-degree between them.

From the protrusion 113 to the protrusion receiver 114 a hole 116 for the bolt 10 passes through.

When the protrusion 113 of one of the corner spacer 111 fitted in the protrusion receiver 114 of another corner spacer, an end of the rail 101 is held between the facing rail receivers 115, 115 of both corner spacers 111, 111, and by the spacing portion 112 it can be kept of a fixed space between the outer carrier discs 71, 71 or the inner carrier discs 72, 72.

In the state, respective carrier discs 71, 72 are assembled, the bolts 10 pass through the corner spacers 111 which continue with each other and they are fixed by the nuts 11.

The lowermost outer carrier disc 72" is connected outward with the lowermost inner carrier disc 71" by means of the H-shaped rail 101 and put on the receiving frame 73. When the outer carrier disc 72 is formed with the units 88, the mutual units 88 are also connected with each other by means of the H-shaped rail 101 and encircle the outer circumference of the inner carrier disc 71. Along the outer circumference of the H-shaped rail 101 which connects the inner carrier disc 71 with the outer carrier disc 72, the inner partition wall 1' is surrounded.

Here, again another outer carrier disc put through the spacer 76 thereupon and the inner partition wall 1' is surrounded. Hereinafter assembled like this, let the bolt 10 pass through the uppermost outer carrier disc 72' and the lowermost outer carrier disc 72" and let them fasten with nuts 11.

The outer casing 2 is a cylinder and coaxially arranged with the inner partition wall 1', and the downward circuit 13 for flowing the circulating waste water downward is formed between them. The bottom of the outer casing 2 is closed by the bottom cap 12 and the top is closed by the top plate 121. And the outer casing 2 is, above the uppermost inner carrier disc 71', provided with the outflow port 14 for the treated water and the exhaust ports 122 above the outflow port 14.

The outer carrier discs 72 are piled in the downward circuit 13 with a space between every two outer carrier discs and the outer casing 2 is in close contact with each of them. The outer carrier disc 72 may be formed by connecting in ring-shaped the units 88. The unit 88 in the form of a fan when the outer casing 2 is a cylinder and a trapezoid when a similar figure.

The inner casing 1 used in case of the first apparatus is not used in the second apparatus and the inner partition walls 1' connected through the outer carrier disc upward and downward forms the inner casing 1 in appearance to act its function. Also the circular gutter 34 is omitted, by connecting the outflow port 14 directly with the outflow pipe 35.

In case of the second apparatus, the waste water rises with the air in the inner casing 1 in appearance formed with the inner partition walls 1' piled through the outer carrier discs 72. The organic substances included therein contact with the microorganisms in the inner carrier discs 71 and become the prey of them and the waste water overflows at the upper end of the inner casing 1.

The waste water in the inner casing 1 increases its capacity by the numberless foams fed therein so that part of it rises in a space enclosed by the circular board 32 and flows out in the overflow groove 31 through the orifices 31' and then it flows out directly in the outflow pipe 35 through the outflow port 14. Also the foams are separated in the space from the waste water and exhausted through the exhaust ports 122.

The great part of the waste water which overflowed at the end of the inner casing and lost the foams included therein flows in and down naturally the downward circuit around the outer circumference. Flowing down through the outer carrier discs 72, the waste water comes in contact with the microorganisms taken root therein and the organic substances in it become the prey of them. Accordingly, it rises the purifying degree of waste water per one circulation.

The passing speeds through the inner and the outer carrier discs 71 and 72 under a certain condition are as follows.

<Inner carrier disc>

| | |
|---|---|
| Sectional area in appearance: | 0.4935 m$^2$ |
| Sectional area for passing the circulating water there through: | 0.1029 m$^2$ |
| Open area rate: | (0.1029/0.4935) × 100 = 20.85% |
| | Q = 69.41/min (100 m$^3$/d) |
| Quantity of air: | 1000 l/min |
| Passing speed: | $V_0$(69.4 + 1000) × 10$^{-3}$ × 1/0.4935 = 0.0361 m/s |
| | $V_1$(69.4 + 1000) × 10$^{-3}$ × 1/0.1029 = 0.173 m/s |

<Outer carrier disc>

| | |
|---|---|
| Sectional area in appearance: | 0.6684 m$^2$ (OUT/IN = 1.35) |
| Sectional area for passing the circulating water there through: | 0.1334 m$^2$ (OUT/IN = 1.30) |
| Open area rate: | (0.1334/0.6684) × 100 = 19.96% (OUT/IN = 1.30) |
| | Q = 69.41/min (100 m$^3$/d) |
| Quantity of air: | 1000 l/min |
| Passing speed: | $V_0$ 69.4 × 10$^{-3}$ × 1/60 × 1/0.6684 = 0.000173 m/s (OUT/IN = 0.05) |
| | $V_1$ 69.4 × 10$^{-3}$ × 1/60 × 1/0.1334 = 0.00867 m/s (OUT/IN = 0.05) |

The outflow port 14 is at its inner end open to the overflow groove 31 around the inner periphery of the outer casing 2. The overflow groove 31 is formed, by fixing the outward flange 33 at the lower end of the circular board 32 through which the orifices 31' pass through radially to the inner periphery of the outer casing 2. When made like this, by adjusting the heights between the opening plane, that is, the overflowing plane for the waste water, at the upper end of the inner casing 1 and the orifices 1' of the overflow groove 31, it can be settled quantity of waste water to be circulated.

Figure 25:
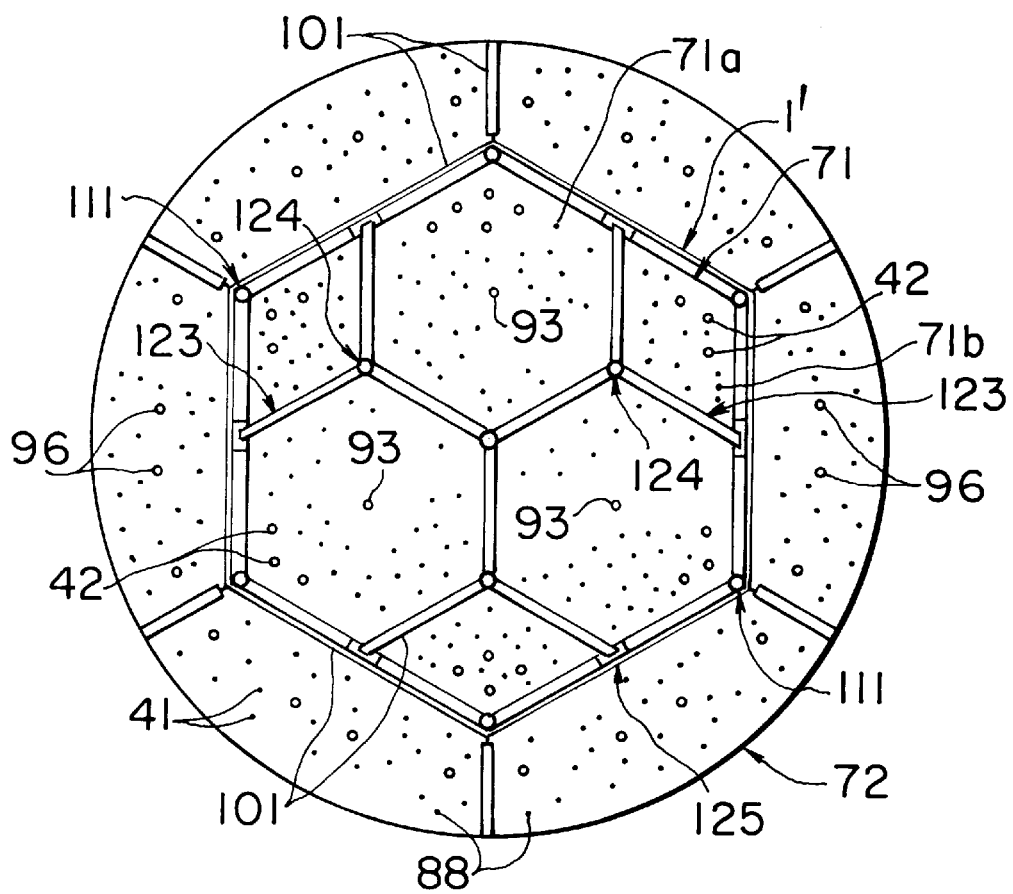
FIG. 25 is a plan view illustrates one embodiment of an assembly of the inner carrier discs used in the third apparatus of the present invention.
Figure 26:
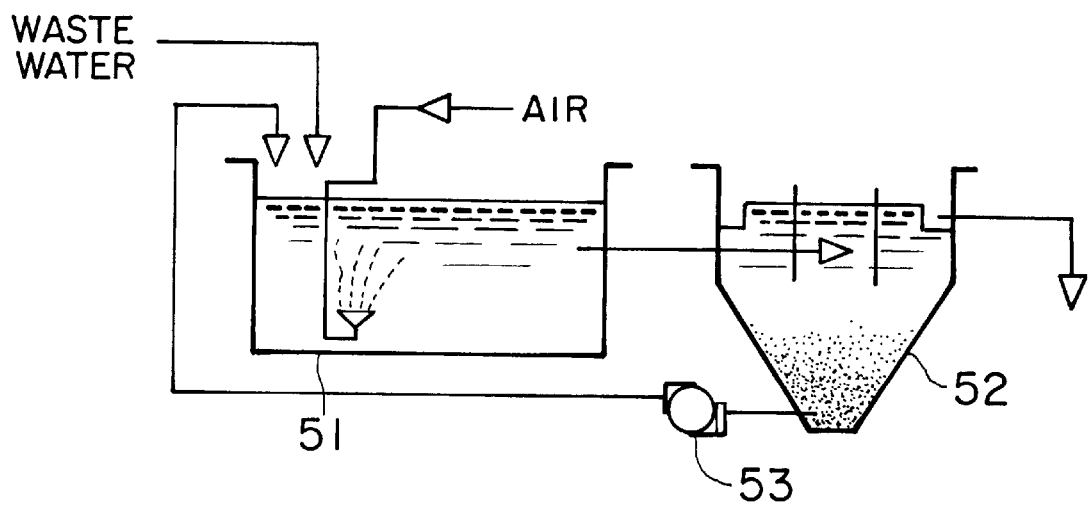
FIG. 26 is a rough drawing of an apparatus for treating organic waste water heretofore in use.

FIG. 25 is a plan view of the parts of the inner and the outer carrier discs 71 and 72 used in the third apparatus of the present invention. The third apparatus is similar to the second apparatus so that it is mainly set forth the different points from the second apparatus.

The inner carrier disc 71 becomes an assembled carrier disc. The inner disc 71 comprises three regular hexagonal discs 71a and three rhombic segments 71b in the shape of trisection of the regular hexagon. The inner carrier disc 71 is made by arranging the regular hexagonal disc 71a in the center in a honeycomb fashion and the rhombic segments 71b in the empty portions 123 in the outer circumference. The outer carrier discs are, though omitted in the drawing, arranged coaxially with and forming a downward circuit 13 for liquid between them. And, in the downward circuit the plural outer carrier discs 72 are piled with a space between every two outer carrier discs.

In this case, when it is assembled in order the regular hexagonal discs 71a and the rhombic segments 71b, a large assembly of the carrier disc can be obtained so that it can easily be formed an apparatus of large scale.

The process of treating waste water is the same as in the second apparatus.

Figure 23:
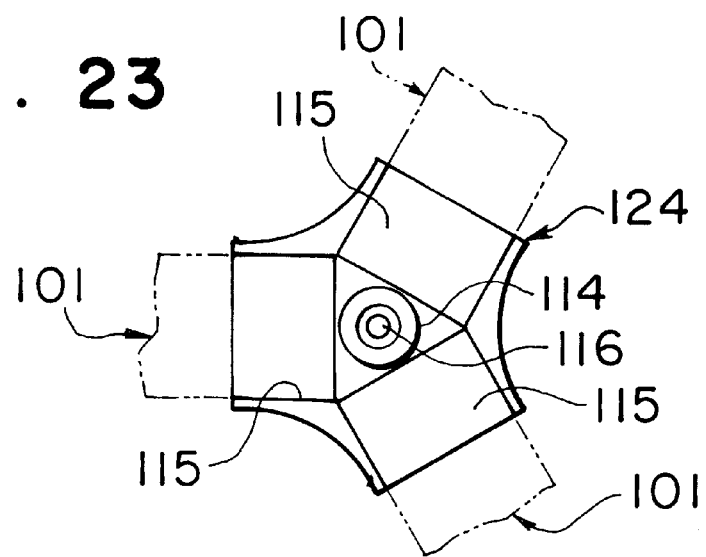
FIG. 23 is a plan view of the corner spacer 124.

To connect the regular hexagonal disc 71a with the rhombic segment 71b which forms a carrier disc assembly in this case, the H-shaped rail 101 in the second apparatus and corner spacers 124 (FIG. 23) which is a modification of the corner spacer 111 and has rail receivers 115 spread with 60-degree between them.

Figure 24:
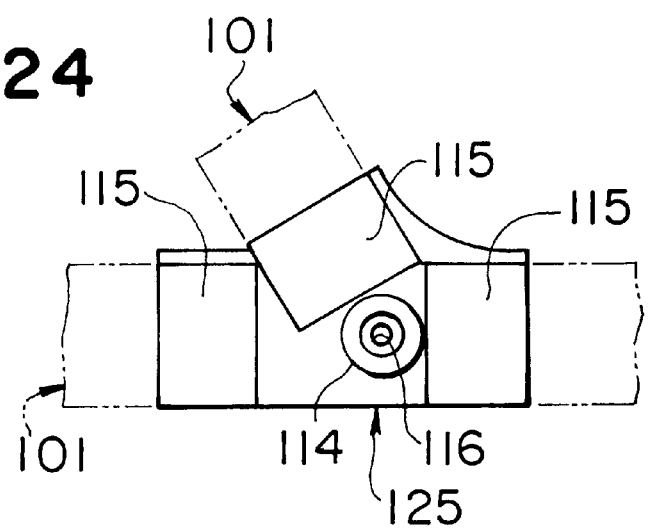
FIG. 24 is a plan view of the corner spacer 125.

Also, at the connecting portion of an out side of the regular hexagonal disc 71a with the rhombic segment 71b, a corner spacer 125 (FIG. 24) is adopted, which has the rail receivers 115 which spread at right angle with the axial line with a 180-degree and which has a rail receiver 115 which in both the rail receivers spreads with a 60-degree to one of the receivers.

The corner spacer arranged at the outer corner of the rhombic segment 71b is the same as the corner spacer 111 of the second apparatus.

The piling of the outer carrier discs 72 is the same as the second apparatus, and in case of its size being too large, it may be formed as a unit 88 and further, the unit 88 may be formed by connecting divided parts in two or more with each other.

The process of treating waste water is done like as in the second apparatus.

EFFECTS OF THE INVENTION

According to the first apparatus of the present invention, as microorganisms are made to take root in the porous carrier discs, which are piled in the inner casing with each space between every two carrier discs, it becomes sufficient the contacting efficiency of microorganisms with waste water.

Also, as the inner casing being arranged in the outer casing coaxially with it, the downward circuit for the waste water to be treated is formed between them and under the lower end of the inner casing an air scattering disc for sending out air as small foams is provided, waste water to be treated rises by the foams in the inner casing and overflows at the opening plane at its upper end in the downward circuit between them to the bottom portion of the outer casing. The waste water flows again in the inner casing and rises by the foams. Thus, the circuit of the waste water is formed and during its circulation organic matters in the waste water becomes the prey of the microorganisms taken root to the carrier discs in the inner casing.

As the outer casing has the outflow holes which are open to the upper portion than the overflowing plane of the inner casing, it can overflow outward part of the circulating waste water through the outflow holes so that even the apparatus of small size can effectively treat waste water.

When arranging the treating apparatus in series, it can cope with quality of waste water and when in parallel it can cope with its quantity.

According to claim 2, by deciding the height from the outflowing plane of the inner casing to the orifices, it can vary the circulating volume of the waste water to be treated, therefore, the more frequency of circulation are set, the more highly purified treated waste water can be taken out.

According to claim 3, as it prevents foams and the waste water from rising perpendicularly, the air stays long, and therefore, the oxide melted therein increases and acts effectively on existence of microorganisms, and also the waste water snakes and increases a chance of contacting waste water with microorganisms.

According to claim 4, as part of the waste water rises with less resistance through the large holes, it is useful for purifying the waste water, by increasing the number of its circulating times, and in the small holes it can effectively supply microorganisms with the oxide melted therein.

According to claim 5, the frictional resistance of the waste water included foams is reduced and airlock can be checked.

According to claim 6, the rising flow of the water mixed with the foams becomes equalized and the air stays long. The foams are prevented from gathering with each other or from becoming one body.

According to claim 7, the carrier discs are washed by rising foams and water and prevented from stacking thereto inert organisms, such as, algae, mold, etc., so that micro pores in the carrier discs are not clogged, life environment of microorganisms is kept comfortably and the carrier disc can be used long.

According to claim 8 of the second apparatus of the present invention, as it is piled in order the inner or the outer carrier discs and the inner partition walls, an apparatus of a large scale is made easily. And it can be raised the degree of purifying the circulating waste water as it falls under the preying function of the microorganisms at both the inner and the outer carrier discs. Also as the upper end of the outer casing is closed by the top plate and has the exhaust ports at its upper portion, rainwater, snowfall and dust do not enter and it can keep the capacity of treating waste water from lowering.

According to claim 9, the overflowed water can be flowed directly to the outflow pipe through the outflow port.

According to claims 10 through 12, they function like as stated claims 3 through 5, respectively.

According to claim 13, by connecting the outer carrier discs in a ring-like form in a horizontal plane, they are closely fit in the downward circuit around the outer circumference for flowing down the waste water.

According to claim 14, respective connecting portion closely contacts with each other and the connection is easily done.

According to claim 15 of the third apparatus of the present invention, as the regular hexagonal inner carrier disc is formed rhombic segments in the shape of trisection of the regular hexagonal segment in the same plane, when choosing number of them and forming a regular hexagon, it can freely be formed the inner carrier discs of from small to large sizes.

It is the same as the second apparatus the effect of closing the top of the outer casing with the top plate.

According to claim 16, the same function as set forth in claim 9 is effectual.

According to claims 17 through 19, the same functions as set forth in claims 3 through 5, respectively, are effective.

According to claim 20, the same function as set forth in claim 13 is effective.

According to claim 21, the same function as set forth in claim 14 is effective.

What is claimed is:

1. An apparatus for treating organic waste water utilizing microorganisms, comprising: an inner casing (1), an outer casing (2), a waste water supply tank (3) and an air supply pipe (4), said inner casing (1) being of a vertical type with its upper and lower ends open; and said inner casing (1) having a stack/pile of porous carrier discs (7) of polyethylene to which microorganisms take root and which have liquid passages (6) with a spacer between every two carrier discs (7), said outer casing (2) being of a vertical type with its bottom closed by a bottom cap (12), and being coaxially arranged with said inner casing (1) with a downward liquid circuit (13) for liquid flow between said inner and outer casings (1,2) and having outflow ports (14) for treated water above the upper end of said inner casing (1), said waste water supply tank (3) providing a waste water head so as to flow into said outer casing (2), and having an open waste water supply pipe (15), with said waste water communicating with the bottom of said outer casing (2) by a leading pipe (19) and having an overflow (20) to keep said water water level constant, and said air supply pipe (4) being connected with an air scattering disc (22) below the lower end of said inner casing (1) in said outer casing (2).

2. An apparatus for treating organic waste water utilizing microorganisms as claimed in claim 1, wherein said outflow ports (14) are made radially, each inner end plane open to an overflow groove (31) provided along the inner periphery of said outer casing (2), said overflow groove (31) being formed, by fixing an outer flange (33) at the lower end of a circular board (32) through which orifices (31') pass radially to the inner periphery of said outer casing (2), the outer end planes of said outflow ports (14) being open to a circular gutter (34), and said circular gutter (34) being provided on the outer circumference of said outer casing (2) and connected with an outflow pipe (35).

3. An apparatus for treating organic waste water utilizing microorganisms as claimed in claim 2, wherein said circular board (32) also functions as a guide pipe to lead part of the treated water upward and to overflow same through said orifices (31').

4. An apparatus for treating organic waste water utilizing microorganisms as claimed in anyone of claims 1 or 3, wherein said liquid passages (6) comprise small holes (41) and large holes (42) on the surface of each said carrier discs (7), said large holes (42) of two said carrier discs adjacently disposed upwardly and downwardly being shifted with respect to each other in the horizontal plane so that said large holes (42) do not align in a vertical line.

5. An apparatus for treating organic waste water utilizing microorganisms as claimed in claim 4, wherein said liquid passage (6) is in the shape of a cone cut off at its head, a bore of said liquid passage (6) in the waste water inflow side being smaller than that of an outflow side.

6. An apparatus for treating organic waste water utilizing microorganisms as claimed in claim 4, wherein on the under plane of said carrier disc (7) barriers (43) are provided.

7. An apparatus for treating organic waste water utilizing microorganisms as claimed in claim 4, wherein said carrier discs (7) are washed by rising foams and water to prevent from stacking thereto inert organisms, such as, algae, mold, etc., so that micro pores in said carrier discs are precluded from clogging.

8. An apparatus for treating organic waste water utilizing microorganisms as claimed in claim 1, wherein said liquid passage (6) is in the shape of a cone cut off at its head, a bore of said liquid passage (6) in the waste water inflow side being smaller than that of an outflow side.

9. An apparatus for treating organic waste water utilizing microorganisms as claimed in claim 1, wherein on the under plane of said carrier disc (7) barriers (43) are provided.

10. An apparatus for treating organic waste water utilizing microorganisms as claimed in claim 9, wherein said carrier discs (7) are washed by rising foams and water to prevent from stacking thereto inert organisms, such as, algae, mold, etc., so that micro pores in said carrier discs are precluded from clogging.

11. A An apparatus for treating organic waste water utilizing microorganisms as claimed in claim 1, wherein said carrier discs (7) are washed by rising foams and water to prevent from stacking thereto inert organisms, such as, algae, mold, etc., so that micro pores in said carrier discs are precluded from clogging.

12. An apparatus for treating organic waste water utilizing microorganisms, comprising: inner partition walls (1'), an outer casing (2), a waste water supply tank (3) and an air supply pipe (4), said inner partition walls (1') forming a substantially inner casing (1) arranged respectively along the outer periphery of a stack/pile of hexagonal inner carrier discs (71) of polyethylene stacked closely with a spacer between every two inner carrier discs (71), said inner carrier discs (71) being piled/stacked in the same phase within inner said partition walls (1'), and each inner carrier disc being porous and having liquid passages (6) for microorganisms to take root thereto, said outer casing (2) being coaxially arranged with said inner casing (1) with a downward liquid flow circuit (13) for liquid to pass between said inner casing (1) and said outer casing (2); and said outer casing (2) being closed at its bottom by a bottom cap (12) and at its top by a top plate (121), respectively; and said outer casing (2) having an outflow port (14) for treated water above the uppermost inner carrier disc (71') and exhaust ports (122) above said outflow port (14), in said downward liquid flow circuit (13), and porous outer carrier discs (72) of polyethylene for microorganisms to root thereto being stacked/piled with a spacer between every two discs, said waste water supply tank (3) providing a waste water head to flow into said outer casing (2), above which a waste water supply line (15) with said waste water communicating with the bottom of said outer casing (2) by a leading pipe (19) and having an overflow (20) to keep said waste water level constant, and said air supply pipe (4) being connected with an air scattering disc (22) below the lower end of said inner casing (1) in said outer casing (2).

13. An apparatus for treating organic waste water utilizing microorganisms as claimed in claim 12, wherein said outflow port (14) is open at its inner end to an overflow groove (31) provided along the inner periphery of said outer casing (2), said overflow groove (31) being formed, by fixing an outer flange (33) at the lower end of a circular board (32) through which orifices (31') pass radially to the inner periphery of said outer casing (2), the outer end face of said outflow port (14) being open to a circular gutter (34), and said gutter (34) being provided on the outer circumference of said outer casing (2) and connected with a outflow pipe (35).

14. An apparatus for treating organic waste water utilizing microorganisms as claimed in claim 13, wherein said circular board (32) also functions as a guide pipe to lead part of the treated water upward and to overflow same through said orifices (31').

15. An apparatus for treating organic waste water utilizing microorganisms as claimed in claim 12, wherein said liquid passages (6) comprise small holes (41) and large holes (42) on the surface of each said carrier disc (71), said large holes (42) of two said carrier discs adjacently disposed upwardly and downwardly thereof being shifted with respect to each other in the horizontal plane so that said large holes (42) do not align in a vertical line.

16. An apparatus for treating organic waste water utilizing microorganisms as claimed in claim 12 or 15, wherein said liquid passage (6) is in the shape of a cone cut off at its head, a bore of said liquid passage (6) in the waste water inflow side being smaller than that of an outflow side.

17. An apparatus for treating organic waste water utilizing microorganisms as claimed in claim 12, wherein each of said outer carrier discs (72) being made by connecting units (88) in a ring-like form, each of said units (88) being of a shape which corresponds to a segment formed by a side of said inner carrier disc (71), and radiations from the center of said inner carrier disc (71) to both ends of said side and a side of said outer casing (2) being cut off by said radiations.

18. An apparatus for treating organic waste water utilizing microorganisms as claimed in claim 17, wherein said hexagonal inner carrier discs (71) and said connecting units (88) and mutual connecting units are connected, by fitting each in respective grooves (102) of an H-shaped rail (101).

19. An apparatus for treating organic waste water utilizing microorganisms, comprising: inner partition walls (1'), an outer casing (2), a waste water supply tank (3) and an air supply pipe (4), inner partition walls (1') forming a substantially inner casing (1) arranged respectively along the outer periphery of a stack/pile of hexagonal inner carrier discs which form an assembly (71) with a spacer between every two inner carrier discs, said inner carrier discs (71) being piled in the same phase with said space, each inner carrier disc of the inner carrier assembly being made of polyethylene which is porous and has liquid passages (6) for microorganisms to take root thereto, said carrier disc assembly comprising regular hexagonal discs (71a) and rhombic segments (71b) of diamond like shape with said regular hexagonal discs in the center of a honeycomb and said rhombic segments (71b) in the empty portions (12) at the outer circumference, said outer casing (2) being coaxially arranged with aid inner casing (1) with a circular flowing down passage (13) for liquid between said inner casing (1) and said outer casing (2), said outer casing (2) being closed at its bottom by a bottom cap (12) and at its top by a top plate (121), respectively; and said outer casing (2) having a outflow port (14) for treated water above the uppermost inner carrier disc (71') and exhaust ports (122) above said outflow port (14), in said flowing down passage (13), and porous outer carrier discs (72) of polyethylene for microorganisms to root thereto being closely piled with a spacer between every two discs, said waste water supply tank (3) providing a waste water head to flow into said outer casing (2), above which a waste water supply pipe (15), with said waste water communicating with the bottom of said outer casing (2) by a leading pipe (19) and having an overflow (20) to keep said waste water level constant, and said air supply pipe (4) being connected with an air scattering disc (22) below the lower end of said inner casing (1) in said outer casing (2).

20. An apparatus for treating organic waste water utilizing microorganisms as claimed in claim 19, wherein said outflow port (14) is open at its inner end to an overflow groove (31) provided along an inner periphery of said outer casing (2), said overflow groove (31) being formed, by fixing an outer flange (33) at the lower end of a circular board (32) through which orifices (31') pass radially to an inner periphery of said outer casing (2), the outer end face of said outflow port (14) being open to a circular gutter (34), and said circular gutter (34) being provided on the outer circumference of said outer casing (2) and connected with a outflow pipe (35).

21. An apparatus for treating organic waste water utilizing microorganisms as claimed in claim 20, wherein said circular board (32) also functions as a guide pipe to lead part of the treated water upward and to overflow through said orifice (31').

22. An apparatus for treating organic waste water utilizing microorganisms as claimed in claim 19, wherein said liquid passages (6) comprise small holes (41) provided substantially all over the surface and large holes (42) on the surface of each said carrier disc (71), said large holes (42) of two said carrier discs adjacently disposed upwardly and downwardly thereof being shifted with respect to each other in the horizontal plane so that said large holes (42) do not align in a vertical line.

23. An apparatus for treating organic waste water utilizing microorganisms as claimed in anyone of claims 19 or 22, wherein said liquid passage (6) is in the shape of a cone cut off at its head, and a bore of said liquid passage (6) in the waste water inflow side being smaller than that of an outflow side.

24. An apparatus for treating organic waste water utilizing microorganisms as claimed in claim 19, wherein each of said outer carrier discs (72) being made by connecting units (88) in a ring-like form, each units (88) being of a shape which corresponds to a segment formed by a side of said inner carrier disc and radiations from the center of said inner carrier disc (71) to both ends of said side and a side of said outer casing (2) being cut off by said radiations.

25. An apparatus for treating organic waste water utilizing microorganisms as claimed in claim 24, wherein three regular hexagonal discs (71*a*) are juxtaposed so that three common edges thereof, with three rhombic segments (71*b*) juxtaposed so that a pair of edges thereof face alongside edges of said hexagonal discs closest to said three common edges that one large hexagonal disc assembly with six large sides is formed; with a unit (88) juxtaposed each of said six large sides, and H-shaped rails forming connector means along the edges between said regular hexagonal discs, said rhombic segments and said units, whereby an outer carrier disc (72) is formed as an assembled carrier disc of circular configuration.

* * * * *